United States Patent
Vecera et al.

(10) Patent No.: US 11,546,224 B2
(45) Date of Patent: Jan. 3, 2023

(54) VIRTUAL NETWORK LAYER FOR DISTRIBUTED SYSTEMS

(71) Applicant: Red Hat, Inc., Raleigh, NC (US)

(72) Inventors: Martin Vecera, Brno (CZ); Miroslav Jaros, Brno (CZ); Stefan Bunciak, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 64 days.

(21) Appl. No.: 16/407,831

(22) Filed: May 9, 2019

(65) Prior Publication Data
US 2020/0358660 A1 Nov. 12, 2020

(51) Int. Cl.
| | |
|---|---|
| *H04L 41/14* | (2022.01) |
| *H04L 41/12* | (2022.01) |
| *H04L 67/10* | (2022.01) |
| *G06F 9/455* | (2018.01) |
| *H04L 43/067* | (2022.01) |

(52) U.S. Cl.
CPC ........ *H04L 41/145* (2013.01); *G06F 9/45558* (2013.01); *H04L 41/12* (2013.01); *H04L 43/067* (2013.01); *H04L 67/10* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,600,386 B1* | 3/2017 | Thai | H04L 67/10 |
| 9,632,811 B2 | 4/2017 | Kraus et al. | |
| 9,727,439 B2 | 8/2017 | Mohammed et al. | |
| 10,812,366 B1* | 10/2020 | Berenberg | H04L 41/0806 |
| 2001/0049594 A1* | 12/2001 | Kievans | H04L 41/12 703/14 |
| 2005/0265321 A1* | 12/2005 | Rappaport | H04L 41/147 370/352 |
| 2009/0190494 A1* | 7/2009 | De Giovanni | H04L 45/02 370/254 |
| 2011/0142077 A1* | 6/2011 | Wong | H04J 3/0679 370/503 |
| 2013/0297769 A1* | 11/2013 | Chang | G06F 9/445 709/224 |

(Continued)

FOREIGN PATENT DOCUMENTS

WO 2018/128598 A1 7/2018

OTHER PUBLICATIONS

Brambilla, G., et al., "A Simulation Platform for Large-Scale Internet of Things Scenarios in Urban Environments," 2014, University of Parma, Italy, pp. 50-55.

(Continued)

*Primary Examiner* — Andre Tacdiran
(74) *Attorney, Agent, or Firm* — Womble Bond Dickinson (US) LLP

(57) ABSTRACT

Parameters associated with a distributed network are received. A topology of a virtual network that corresponds to the distributed network is generated in view of the received parameters. The topology of the virtual network is configured to simulate the distributed network and a simulation of the distributed network is executed using the configured virtual network.

17 Claims, 6 Drawing Sheets

(56) References Cited

U.S. PATENT DOCUMENTS

| | | | |
|---|---|---|---|
| 2015/0319072 A1* | 11/2015 | Chakrabarti | H04L 43/50 370/250 |
| 2016/0254964 A1* | 9/2016 | Bene | H04L 41/0853 709/223 |
| 2016/0291826 A1 | 10/2016 | Verzano | |
| 2016/0330103 A1* | 11/2016 | Lai | H04L 45/38 |
| 2016/0359955 A1* | 12/2016 | Gill | H04L 67/10 |
| 2017/0109260 A1* | 4/2017 | Wang | G06F 11/3684 |
| 2017/0180249 A1* | 6/2017 | Shen | G06F 9/45558 |
| 2017/0289059 A1* | 10/2017 | Wu | H04L 67/2833 |
| 2018/0189089 A1* | 7/2018 | Chen | G06F 9/45558 |
| 2018/0212824 A1* | 7/2018 | Attak | H04L 41/0853 |
| 2018/0248770 A1* | 8/2018 | Regmi | G06F 9/45533 |
| 2018/0375728 A1* | 12/2018 | Gangil | H04L 41/12 |
| 2019/0235906 A1* | 8/2019 | Asawa | G06F 9/4875 |
| 2019/0238509 A1* | 8/2019 | Hi | G06F 9/45558 |
| 2020/0050533 A1* | 2/2020 | Nanjundappa | G06F 11/36 |
| 2020/0065123 A1* | 2/2020 | Yang | G06F 9/455 |
| 2020/0106665 A1* | 4/2020 | Wohlert | H04L 41/0816 |
| 2020/0106676 A1* | 4/2020 | Duda | H04L 41/12 |
| 2020/0106696 A1* | 4/2020 | Michael | H04L 45/123 |
| 2020/0228447 A1* | 7/2020 | Shen | H04L 41/0893 |
| 2020/0241903 A1* | 7/2020 | Wang | G06F 9/451 |

OTHER PUBLICATIONS

Dias, J.P., et al., "State of the Software Development Life-Cycle for the Internet-of-Things," Nov. 9, 2018, Faculty of Engineering, University of Porto, Portugal, 38 pages.
"Is your IoT Solution Ready to Scale?," IoTIFY, 2018, 3 pages.

* cited by examiner

VIRTUAL NETWORK LAYER FOR DISTRIBUTED SYSTEMS

TECHNICAL FIELD

Aspects of the present disclosure relate to a virtual network layer for distributed systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
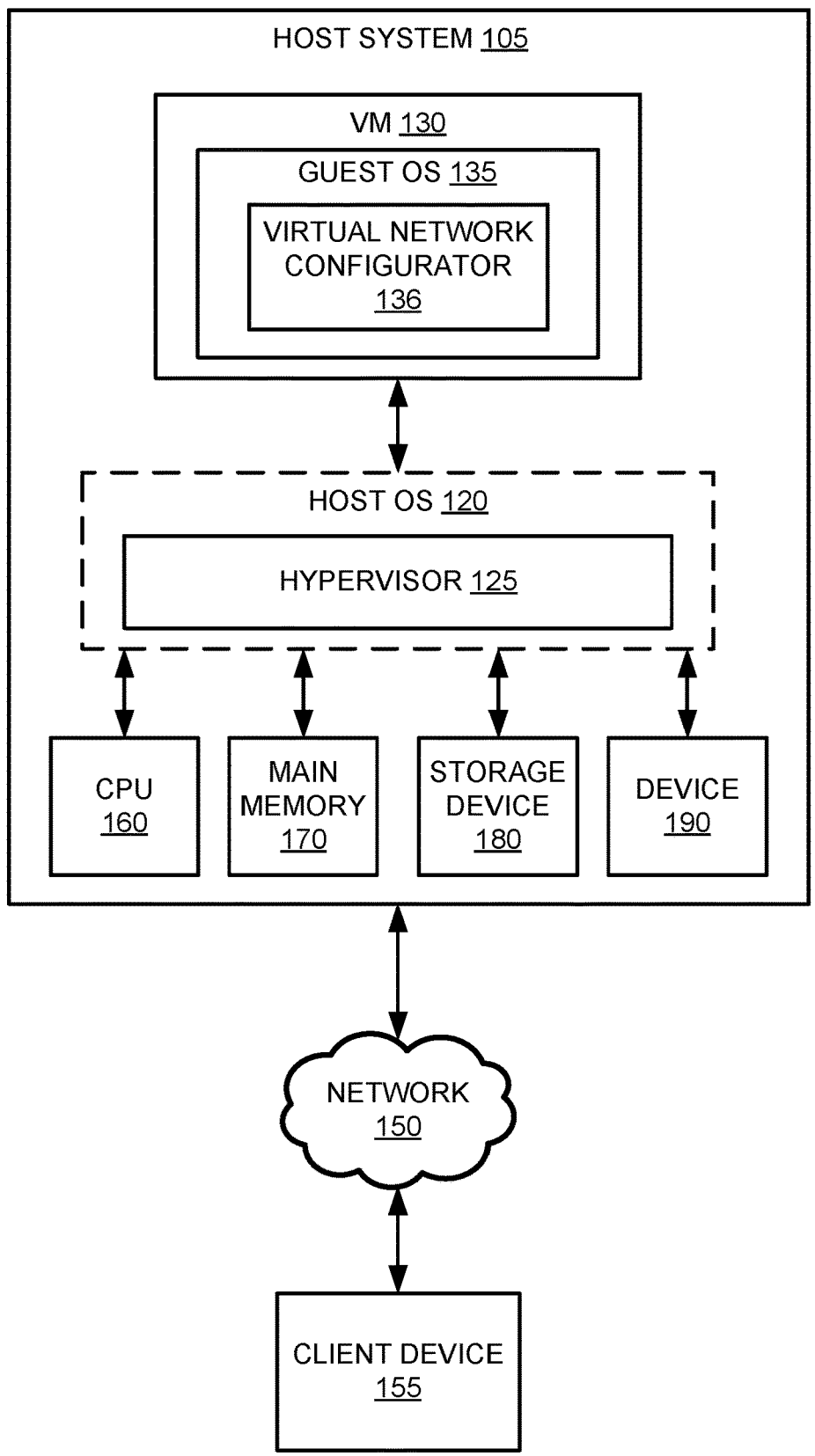
FIG. 1 depicts a high-level component diagram of an example computer system architecture, in accordance with one or more aspects of the present disclosure.

Described herein are methods and systems for a virtual network layer for distributed systems. A distributed system (also referred to as "distributed network" hereafter) is a network system over which data is spread across more than one computing device. The distributed system can form a network topology with various network interconnections to enable communication between the computing devices of the distributed system. In embodiments, distributed systems may include one or more Internet of Things (IoT) devices or sensors connected to the distributed system. For example, an assembly line at a factory may have a distributed system that includes IoT devices or sensors located at various points throughout the assembly line. Applications executed by the IoT devices can have various expectations on the communication latency, where communications/information comes from, where communications/information is sent to, etc. Generally, conditions of a distributed system, particularly of a large distributed system, are not tested prior to implementation. This causes errors related to the topology of the distributed system not being discovered until late in the system deployment, resulting in increased downtime of the distributed system.

Aspects of the disclosure address the above and other deficiencies by generating and configuring a virtual network that simulates a distributed system. A system administrator can provide parameters of a distributed system to a virtual network configurator operating on a virtual machine of a host system. For example, the system administrator can provide the devices, such as IoT devices, used in the distributed system, the number of internet connections of the system, latency values, where communications are being sent to/from, packet loss, host protocols, firewalls, etc. Using the parameters, the virtual network configurator can generate a topology for the virtual network that corresponds to the distributed system. The virtual network topology may include one or more containers that act as isolated execution environments on the host system. Each of the containers may include one or more components of the distributed system, such as IoT devices, routers, etc. The virtual network topology may further include one or more virtual interconnects between the containers of the virtual network topology as well as one or more ports or gateways that serves as an access point to the internet. In some embodiments, a docker may be used for operating system (OS) level virtualization to generate the topology of the virtual network.

Once the topology of the virtual network has been generated, the virtual network configurator configures the topology of the virtual network. The virtual network configurator may set up network interconnects between the containers of the virtual network topology to enable communications to be sent between the containers. The virtual network configurator may set up an internet protocol (IP) data structure that defines one or more rules for the transmission of packets between containers and/or components of the virtual network.

After the topology of the virtual network has been configured, a simulation of the distributed system is executed using the configured virtual network. Executing the simulation may include sending communications to/from the various virtualized components of the virtual network to simulate real world communications being transmitted on the distributed system. Executing the simulation allows a system administrator to identify any potential issues, such as errors, bugs, lost network packets, etc., with the topology of the distributed system. The virtual network configurator may monitor the communications transmitted between components of the virtual network and store information associated with the communications in a data structure. The information may be used to reproduce events that occurred during the execution of the simulation. For example, the information in the data structure may be used to reproduce an error that occurred during execution of the simulation.

During execution of the simulation, the system administrator may provide additional parameters to simulate various events using the virtual network. For example, the administrator may wish to simulate the failure of a router of the distributed system. In response to receiving the additional parameters, the virtual network configurator may adjust the configuration of the virtual network to simulate the event (e.g., the failure of the router).

Accordingly, by generating and configuring a virtual network to simulate a distributed system, any potential issues of the distributed system may be identified prior to the real world deployment of the distributed system. This can prevent costly downtime of the distributed system to diagnose and troubleshoot these issues after deployment. Furthermore, by simulating various events using a virtual network, a more robust distributed system topology can be developed to handle the occurrence of such events.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes a host system 105 and a client device 155 that are communicatively coupled via a network 150. The host system 105 includes one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160. It should be noted that although, for simplicity, a single CPU 160, storage device 180, and device 190 are depicted in FIG. 1, other embodiments of host system 105 may comprise a plurality of CPUs, storage devices, and devices.

Client device 155 may include any suitable type of computing device or machine that has a programmable processor including, for example, server computers, desktop computers, laptop computers, tablet computers, smartphones, set-top boxes, etc. Client device 155 may execute or include an operating system (OS), as discussed in more detail below. The OS of a computing device may manage the execution of other components (e.g., software, applications, etc.) and/or may manage access to the hardware (e.g., processors, memory, storage devices etc.) of the computing device.

The host system 105 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Host system 105 may additionally include one or more virtual machines (VM) 130 and host operating system (OS) 120. VM 130 is a software implementation of a machine that executes programs as though it was an actual physical machine. Host OS 120 manages the hardware resources of the computer system and provides functions such as interprocess communication, scheduling, memory management, and so forth.

VM 130 may include a guest operating system (OS) 135 that handles the execution of applications within the virtual machine. Guest OS 135 may include a virtual network configurator 136, as will be described in further detail below. In some embodiments, the virtual network configurator 136 may be a docker used for operating system (OS) level virtualization to generate a virtual network topology. It should be noted that although, for simplicity, a single VM 130 is depicted in FIG. 1, host system 105 may host multiple VMs 130.

Host OS 120 may include a hypervisor 125, which provides a virtual operating platform for VMs 130 and manages their execution. It should be noted that in some alternative implementations, hypervisor 125 may be external to host OS 120, rather than embedded within host OS 120, or may replace host OS 120. It should be noted that in some alternative implementations, hypervisor 125 may be external to host OS 120, rather than embedded within host OS 120, or may replace host OS 120.

Figure 2:
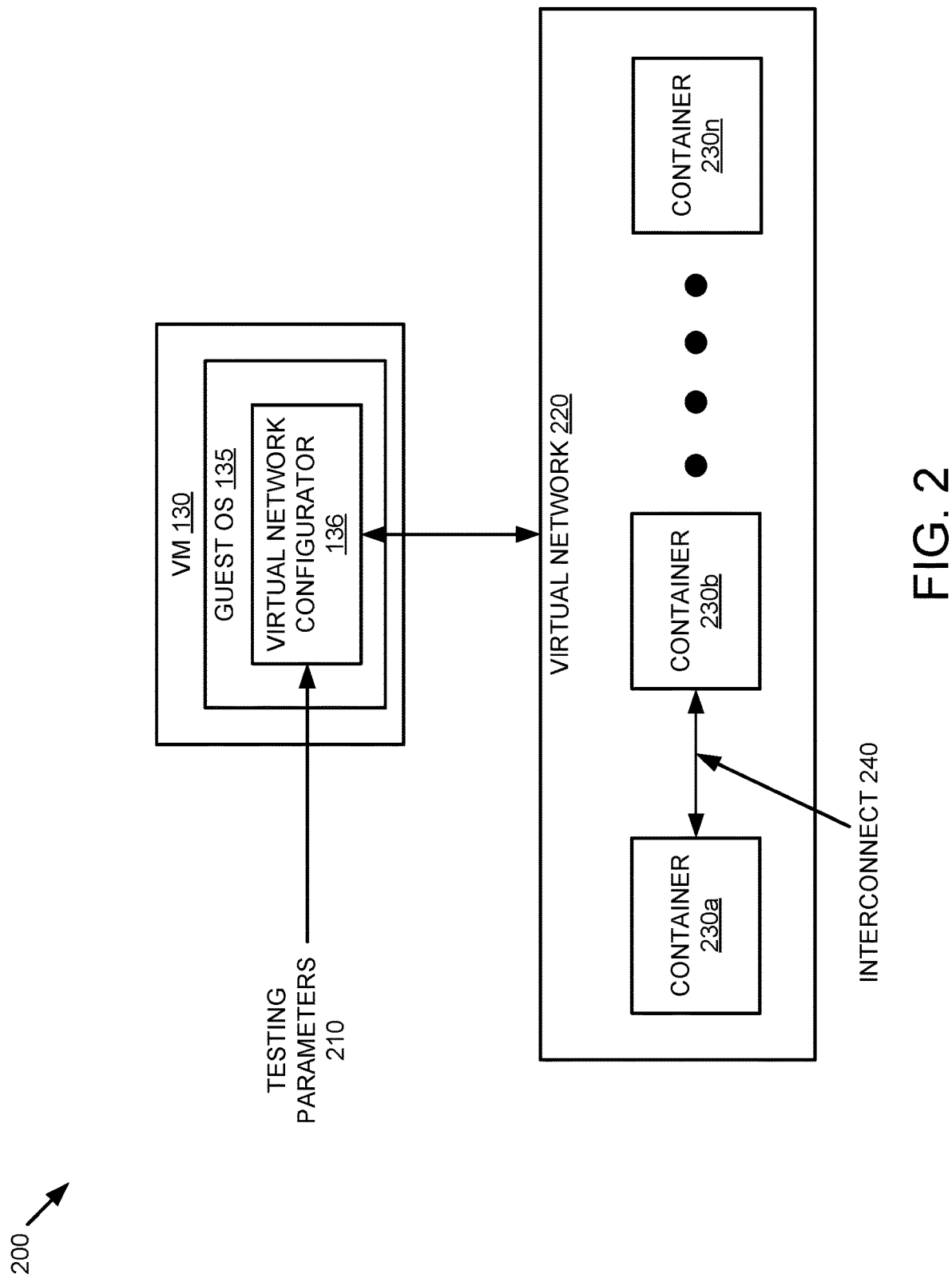
FIG. 2 is an illustration of an example of generating a virtual network topology for simulating a distributed network, in accordance with embodiments of the disclosure.

FIG. 2 is an illustration 200 of an example of generating a virtual network topology for simulating a distributed network, in accordance with embodiments of the disclosure. Client device 155 provides testing parameters 210 associated with a distributed network to a virtual network configurator 136. In embodiments, the testing parameters 210 may include a designed topology for the distributed network. For example, the testing parameters 210 may include various components, devices, internet access points, etc., of the distributed network. The testing parameters 210 may also include parameters for the topology of the distributed system. For example, the testing parameters 210 may include latency values and packet loss at different points in the topology.

Upon receiving the testing parameters 210, the virtual network configurator 136 generates a topology for a virtual network 220 in view of the received testing parameters 210. The virtual network topology is generated to correspond to the real world topology of the distributed network. The topology of the virtual network 220 includes containers 230a-n that each act as isolated execution environments on the host system. Containers 230a-n may each include one or more virtualized components that correspond to the real world components of the distributed network received in the testing parameters 210. The virtual network 220 includes interconnects 240 between containers 230a-n that enable communications to be transmitted between containers 230a-n.

Figure 3:
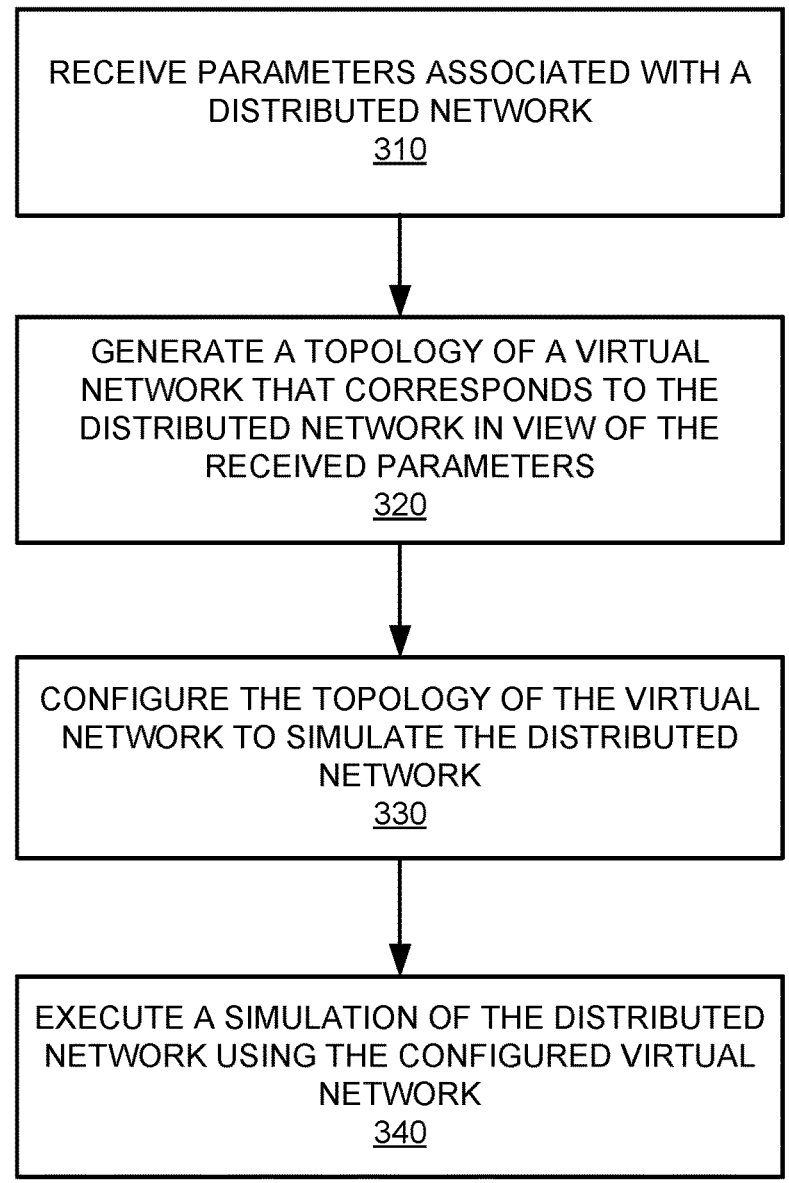
FIG. 3 is a flow diagram of a method of generating and configuring a virtual network to simulate a distributed network, in accordance with some embodiments of the present disclosure.

FIG. 3 is a flow diagram of a method 300 of generating and configuring a virtual network to simulate a distributed network, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 300 may be performed by virtual network configurator 136 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Referring to FIG. 3, at block 310 the processing logic receives parameters associated with a distributed network. The parameters may correspond to the topology of the distributed network that is to be simulated. For example, the parameters may include the computing devices, routers, internet connections, IoT devices, etc., that are to be utilized in the distributed network. The parameters may also include other information associated with the distributed network. In embodiments, the parameters may include latencies at points in the distributed network. For example, the parameters may specify a particular latency for communications at a particular point in the topology. In some embodiments, the parameters may indicate packet losses at points in the distributed network. For example, the parameters may specify that there is to be a 15% packet loss at a particular point in the distributed network. In an embodiment, the parameters may include information associated with one or more firewalls to be implemented in the distributed network. In embodiments, the parameters may include one or more host protocols to be implemented in the distributed network.

At block 320, the processing logic generates a topology of a virtual network that corresponds to the distributed network in view of the received parameters. The topology of the virtual network may be generated to correspond to the real world topology of the distributed network. In embodiments, the topology of the virtual network may include one or more containers that may include virtual components that correspond to the real world components of the distributed network. For example, a container of the virtual network may include a virtual router that corresponds to an actual router that is to be utilized in the distributed network.

At block 330, the processing logic configures the topology of the virtual network to simulate the distributed network. The processing logic may set up network interconnects between the containers of the virtual network topology to enable communications to be sent between the containers to the virtual network topology. The processing logic may generate an IP data structure that defines one or more rules for the transmission of packets between containers and/or components of the virtual network.

At block 340, the processing logic executes a simulation of the distributed network using the configured virtual network. Executing the simulation may include the processing logic transmitting communications to/from the various virtualized components of the virtual network. Executing the simulation may allow a system administrator to identify any potential issues, such as errors, with the topology of the distributed system and take appropriate corrective actions.

Figure 4:
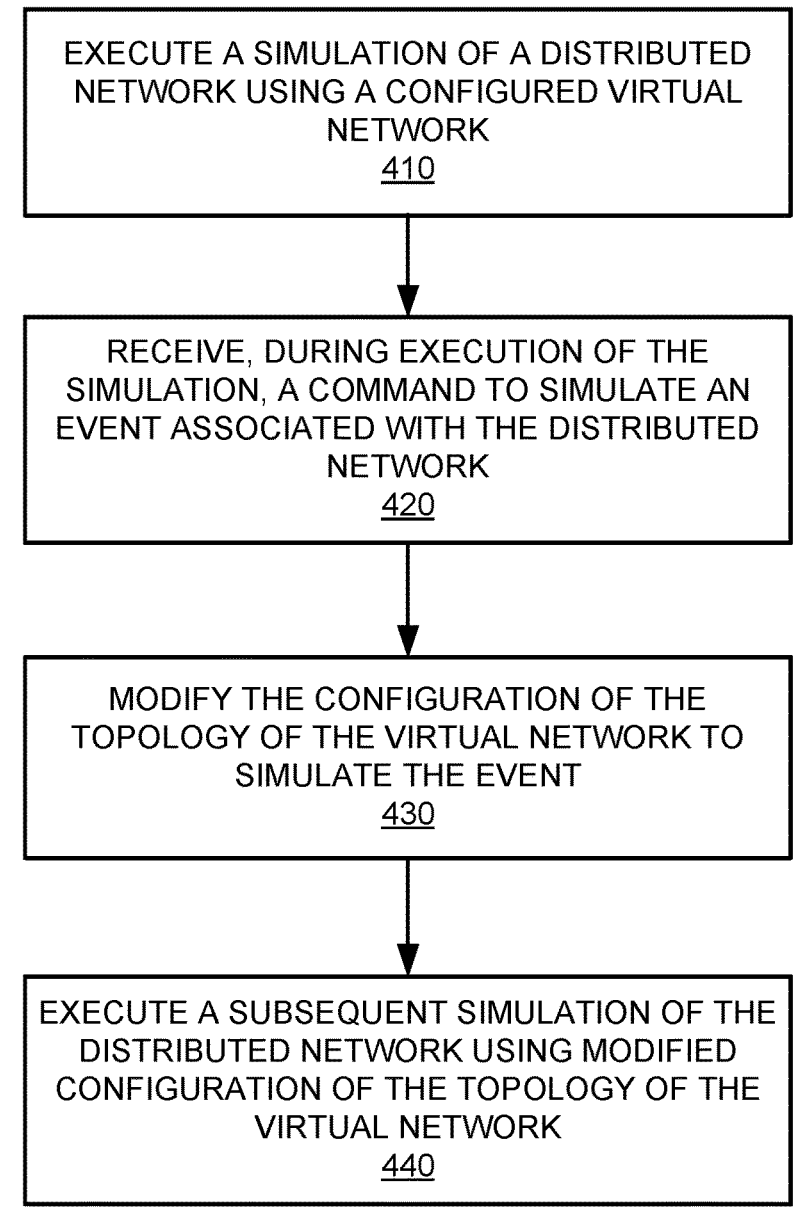
FIG. 4 is a flow diagram of a method of simulating the occurrence of an event during execution of the simulation of the distributed network, in accordance with some embodiments of the present disclosure.

FIG. 4 is a flow diagram of a method 400 of simulating the occurrence of an event during execution of the simulation of the distributed network, in accordance with some embodiments of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 400 may be performed by virtual network configurator 136 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring to FIG. 4, at block 410 the processing logic executes a simulation of a distributed network using a configured virtual network, as previously described at FIG. 3.

At block 420, the processing logic receives, during execution of the simulation, a command to simulate an event associated with the distributed network. During the execution of the simulation, a system administrator may want to simulate various events and monitor the behavior of the virtual network in response to such events. For example, a system administrator may wish to simulate the failure of a router, an amount of packet loss at a point in the network, a network discrepancy, a network disconnection, etc. Accordingly, the system administrator may transmit a command from a client device to the processing logic including parameters to simulate the event. For example, the system administrator may transmit a command that identifies a simulated failure of a particular component (e.g., a router, IoT device, etc.) of the network. In some embodiments, the system administrator may specify an amount of time the component is to be kept in an offline state during the simulation. For example, the command may indicate that a router should be in an offline state 10% of the time, while the remaining 90% of the time the router is in an operational state.

In some embodiments, the system administrator may provide the parameters via a user interface, such as a graphical user interface (GUI). The GUI may include a graphical representation of the topology of the virtual network, which may be displayed on the client device. The system administrator may then select, via the GUI, one or more containers and/or components from the representation of the topology. Upon selection of the component, the system administrator may input parameters associated with the component via the GUI and transmit the command to the processing logic in view of the received selections via the GUI.

In some embodiments, the system administrator may make modifications to the topology of a virtual network via the GUI. For example, upon executing the simulation, the system administrator may determine that an IoT device should be moved to a different location in the topology of the virtual network. The system administrator may select the IoT device via the GUI, select the new location for the IoT device and the processing logic may modify the topology of the virtual network accordingly. In another example, a system administrator may modify the interconnects between containers and/or components of the virtual network via the GUI.

Upon receiving the command, at block 430, the processing logic modifies the configuration of the topology of the virtual network to simulate the event associated with the distributed network. For example, if the received command corresponded to simulating the failure of a router, the processing logic may modify the configuration of the topology of the virtual network to place the router in an offline state.

At block 440, the processing logic executes a subsequent simulation of the distributed network using the modified configuration of the topology of the virtual network that includes the simulation of the event. For example, the processing logic may execute the subsequent simulation that includes the simulation of a failure of a router of the network. In embodiments, method 400 may be performed any number of times to simulate any number of events during the execution of the simulation of the distributed network.

Figure 5:
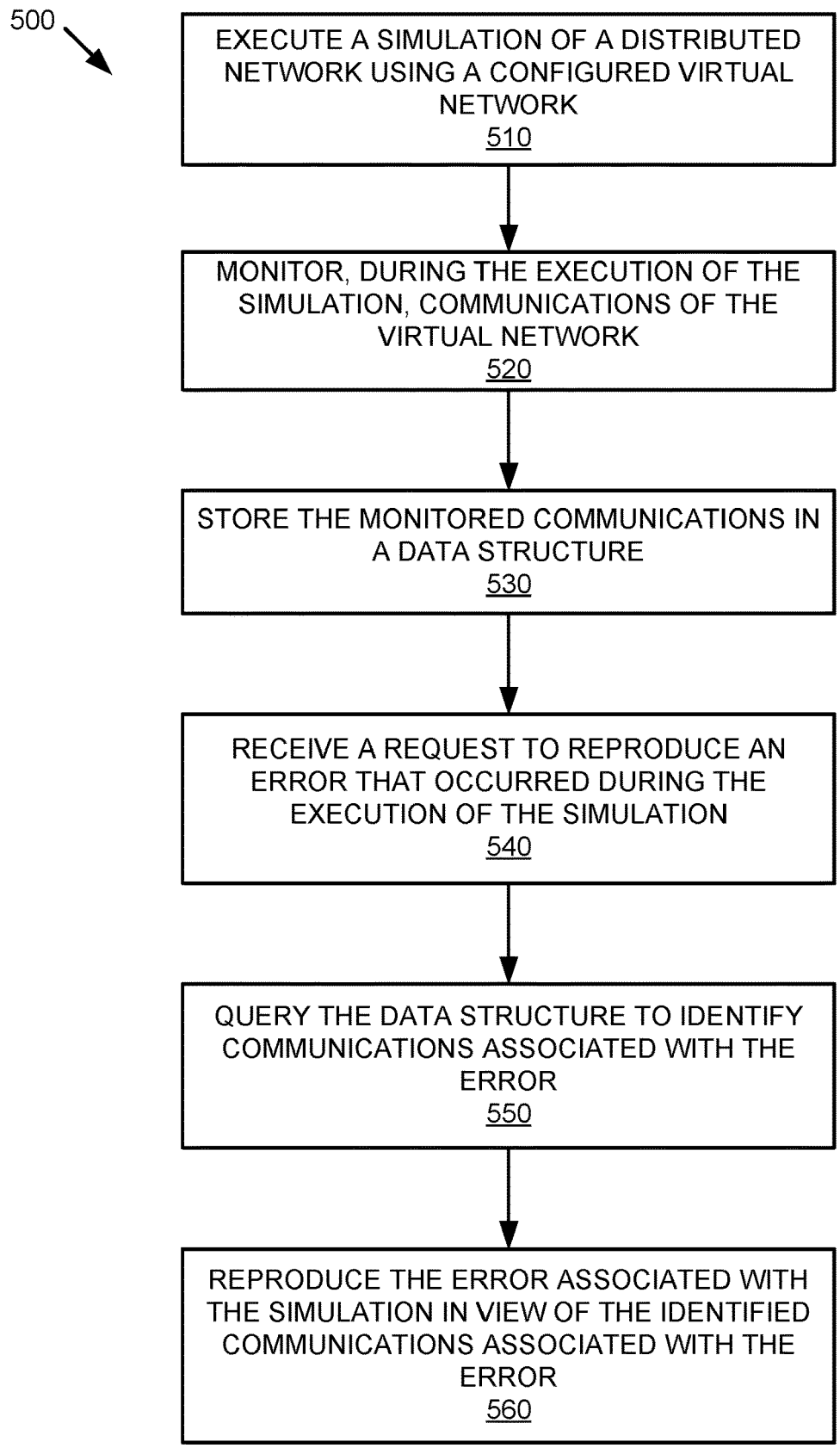
FIG. 5 is a flow diagram of a method of monitoring and storing communications of an executed simulation of a distributed network, in accordance with some embodiments of the present disclosure.

FIG. 5 is a flow diagram of a method 500 of monitoring and storing communications of an executed simulation of a distributed network, in accordance with some embodiments of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 500 may be performed by virtual network configurator 136 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Referring to FIG. 5, at block 510 the processing logic executes a simulation of a distributed network using a configured virtual network, as previously described at FIG. 3.

At block 520, the processing logic monitors, during execution of the simulation, communications of the virtual network. The processing logic may monitor network packets that are transmitted between containers and/or components of the virtual network during the execution of the simulation. The processing logic may identify information associated with the communications. For example, the processing logic may identify a source of the communication (e.g., where the communication was transmitted from), a destination for the communication (e.g., where the communication was transmitted to), a latency of the communication (e.g., the amount of time for the communication to reach the destination), a status of the communication (e.g., the communication successfully/unsuccessfully reached the destination), any types of errors associated with the communications and other information associated with the communications.

At block 530, the processing logic stores the monitored communications in a data structure. The processing logic may store the monitored communications and the identified information in a data structure. The data structure may be a searchable table/list of the communications of the virtual network and information associated with the communications.

At block 540, the processing logic receives a request to reproduce an error that occurred during the execution of the simulation. When an error occurs during execution of a simulation of a distributed network, a system administrator may wish to reproduce the error to troubleshoot the cause of the error and take the appropriate corrective action. Accordingly, the processing logic may receive a request from a client device to reproduce the error that occurred during the simulation. The request may include information associated with the communication(s) that caused the error. For example, the request may include a time the error occurred, an identifier of the communication that caused the error, the source/destination of the communication, etc.

At block 550, the processing logic queries the data structure to identify communications associated with the error. The processing logic may use identification information that is received with the request at block 540 to identify one or more communications in the data structure that are associated with the error. The processing logic may then utilize the information associated with the one or more communications stored in the data structure to subsequently reproduce the error.

At block 560, the processing logic reproduces the error in view of the identified communications associated with the error. Upon locating the information in the data structure, the processing logic may reproduce the error by executing a simulation the distributed network and transmitting the communications associated with the error in view of the information stored at the data structure. Although described as being used to reproduce an error, aspects of method 500 may be utilized to reproduce any communication transmitted on the virtual network during an execution of a simulation of a distributed network.

Figure 6:
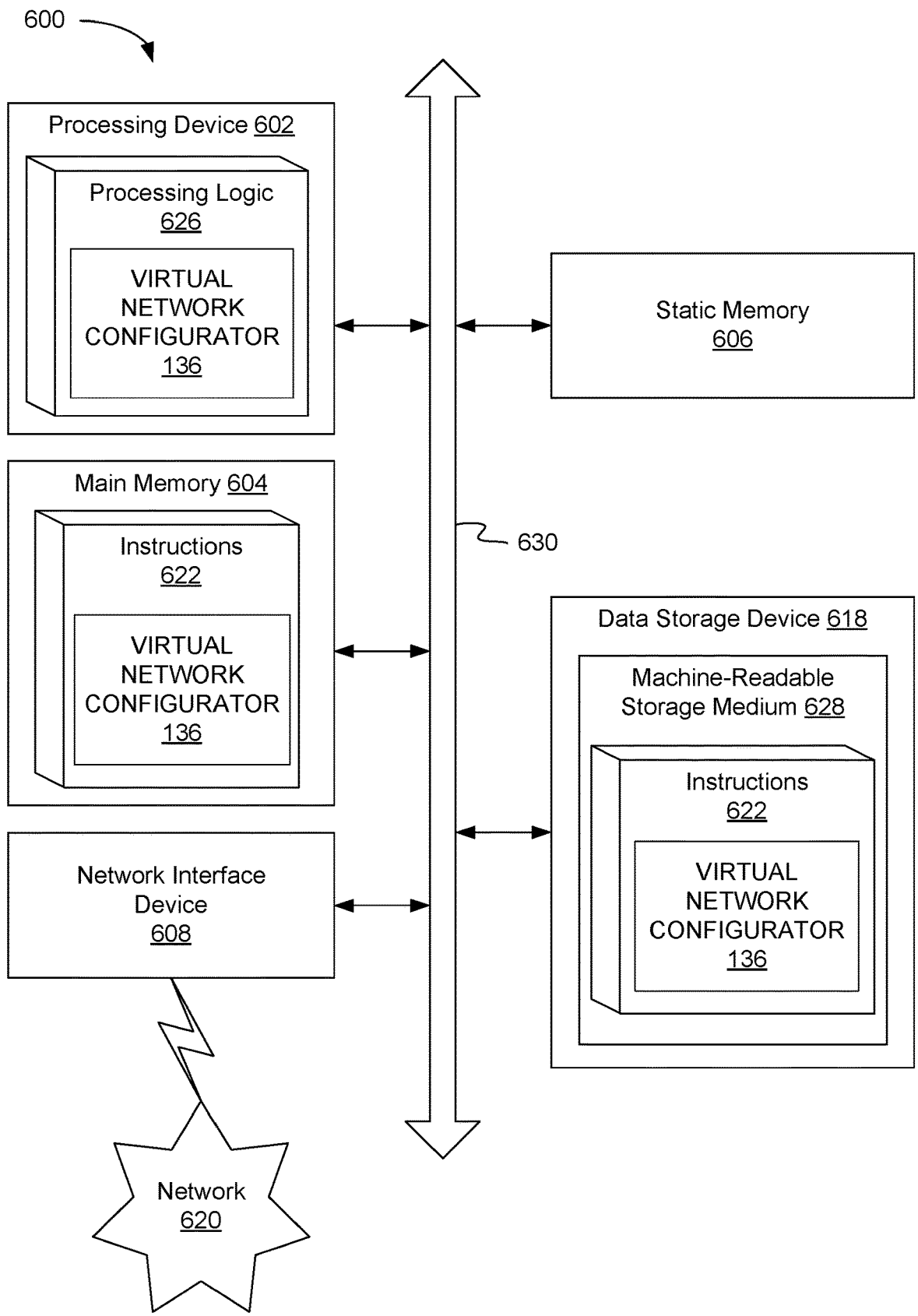
FIG. 6 depicts a block diagram of an illustrative computer system operating in accordance with examples of the invention.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a host system, such as host system 105.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of virtual network configurator 136 of FIG. 1, for performing the operations and steps discussed herein.

The data storage device 618 may include a non-transitory computer-readable storage medium 628, on which is stored one or more set of instructions 622 (e.g., software) embodying any one or more of the methodologies of functions described herein, including instructions to cause the processing device 602 to execute virtual network configurator 136. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The non-transitory computer-readable storage medium 628 may also be used to store instructions to perform a method for multi-level task debugging, as described herein. While the non-transitory computer-readable storage medium 628 is shown in an exemplary embodiment to be a single medium, the term "computer-readable storage medium" should be taken to include a single medium or multiple media (e.g., a centralized or distributed database, or associated caches and servers) that store the one or more sets of instructions. A computer-readable medium includes any mechanism for storing information in a form (e.g., software, processing application) readable by a machine (e.g., a computer). The computer-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method, comprising:
receiving parameters associated with a distributed network, the parameters comprising a physical topology of the distributed network and an indication of a latency at a particular point of the physical topology;
generating, by a processing device, a topology of a virtual network within a virtual machine that corresponds to the distributed network in view of the received parameters,
the topology of the virtual network comprising
a plurality of containers within the virtual machine and
one or more network interconnects between each of the plurality of containers
and at least one other container of the plurality of containers,
each of the plurality of containers comprising at least one component of the virtual network;
configuring, in view of the latency at the particular point of the physical topology, the topology of the virtual network to simulate the distributed network, wherein configuring the topology comprises determining one or more rules for transmission of packets between the plurality of containers via the one or more network interconnects;

executing a simulation of the distributed network using the configured virtual network;

receiving a request to simulate a failure of a particular component of the virtual network;

modifying the topology of the virtual network to simulate the failure of the particular component of the virtual network;

receiving, during execution of the simulation, a command to simulate an event associated with the distributed network;

modifying the configuration of the topology of the virtual network to simulate the event associated with the distributed network; and executing a subsequent simulation of the distributed network using the modified configuration of the topology of the virtual network, the subsequent simulation comprising a simulation of the event.

2. The method of claim 1, wherein configuring the topology of the virtual network to simulate the distributed network further comprises:
configuring the network interconnects of each of the plurality of containers of the virtual network.

3. The method of claim 1, wherein the parameters associated with the distributed network comprise at least one of
components,
packet loss,
firewalls or
host protocols of the distributed network.

4. The method of claim 1, further comprising:
monitoring, during the execution of the simulation, communications of the virtual network; and
storing the monitored communications in a data structure.

5. The method of claim 4, further comprising:
receiving a request to reproduce an error that occurred during the execution of the simulation of the distributed network;
querying the data structure to identify communications associated with the error; and
reproducing the error associated with the simulation in view of the identified communications associated with the error.

6. The method of claim 1, wherein the event associated with the distributed network comprises at least one of a network disconnection or a network discrepancy.

7. A system, comprising:
a memory; and a processing device of a source host system, operatively coupled to the memory, to:
receive parameters associated with a distributed network, the parameters comprising a physical topology of the distributed network and an indication of a latency at a particular point of the physical topology;
generate a topology of a virtual network that corresponds to the distributed network in view of the received parameters,
the topology of the virtual network comprising
a plurality of containers within a virtual machine and one or more network interconnects between each of the plurality of containers
and at least one other container of the plurality of containers,
each of the plurality of containers comprising at least one component of the virtual network;
configure, in view of the latency at the particular point of the physical topology, the topology of the virtual network to simulate the distributed network,
wherein configuring the topology comprises determining one or more rules for transmission of packets between the plurality of containers via the one or more network interconnects;
execute a simulation of the distributed network using the configured virtual network;
receive a request to simulate a failure of a particular component of the virtual network;
modify the topology of the virtual network to simulate the failure of the particular component of the virtual network;
receive, during execution of the simulation, a command to simulate an event associated with the distributed network;
modify the configuration of the topology of the virtual network to simulate the event associated with the distributed network; and
execute a subsequent simulation of the distributed network using the modified configuration of the topology of the virtual network, the subsequent simulation comprising a simulation of the event.

8. The system of claim 7, and
wherein to configure the topology of the virtual network to simulate the distributed network, the processing device is further to:
configure the network interconnects of each of the plurality of containers of the virtual network.

9. The system of claim 7, wherein the parameters associated with the distributed network comprise at least one of
components,
packet loss,
firewalls or
host protocols of the distributed network.

10. The system of claim 7, wherein the processing device is further to:
monitor, during the execution of the simulation, communications of the virtual network; and
store the monitored communications in a data structure.

11. The system of claim 10, wherein the processing device is further to:
receive a request to reproduce an error that occurred during the execution of the simulation of the distributed network;
query the data structure to identify communications associated with the error; and
reproduce the error associated with the simulation in view of the identified communications associated with the error.

12. The system of claim 7, wherein the event associated with the distributed network comprises at least one of, a network disconnection or a network discrepancy.

13. A non-transitory computer-readable storage medium including instructions that, when executed by a processing device, cause the processing device to:
receive parameters associated with a distributed network, the parameters comprising a physical topology of the distributed network and an indication of a latency at a particular point of the physical topology;

generate, by the processing device, a topology of a virtual network that corresponds to the distributed network in view of the received parameters,
the topology of the virtual network comprising
a plurality of containers within a virtual machine and one or more network interconnects between each of the plurality of containers
and at least one other container of the plurality of containers,
each of the plurality of containers comprising at least one component of the virtual network;
configure, in view of the latency at the particular point of the physical topology, the topology of the virtual network to simulate the distributed network,
wherein configuring the topology comprises determining one or more rules for transmission of packets between the plurality of containers via the one or more network interconnects;
execute a simulation of the distributed network using the configured virtual network;
receive a request to simulate a failure of a particular component of the virtual network;
modify the topology of the virtual network to simulate the failure of the particular component of the virtual network;
receive, during execution of the simulation, a command to simulate an event associated with the distributed network;
modify the configuration of the topology of the virtual network to simulate the event associated with the distributed network; and
execute a subsequent simulation of the distributed network using the modified configuration of the topology of the virtual network, the subsequent simulation comprising a simulation of the event.

14. The non-transitory computer-readable storage medium of claim 13,
wherein to configure the topology of the virtual network to simulate the distributed network, the processing device is further to:
configure the network interconnects of each of the plurality of containers of the virtual network.
15. The non-transitory computer-readable storage medium of claim 13,
wherein the parameters associated with the distributed network comprise at least one of
components,
packet loss,
firewalls or
host protocols of the distributed network.
16. The non-transitory computer-readable storage medium of claim 13, wherein the processing device is further to:
monitor, during the execution of the simulation, communications of the virtual network; and
store the monitored communications in a data structure.
17. The non-transitory computer-readable storage medium of claim 16, wherein the processing device is further to:
receive a request to reproduce an error that occurred during the execution of the simulation of the distributed network;
query the data structure to identify communications associated with the error; and
reproduce the error associated with the simulation in view of the identified communications associated with the error.

* * * * *